Figure 1:
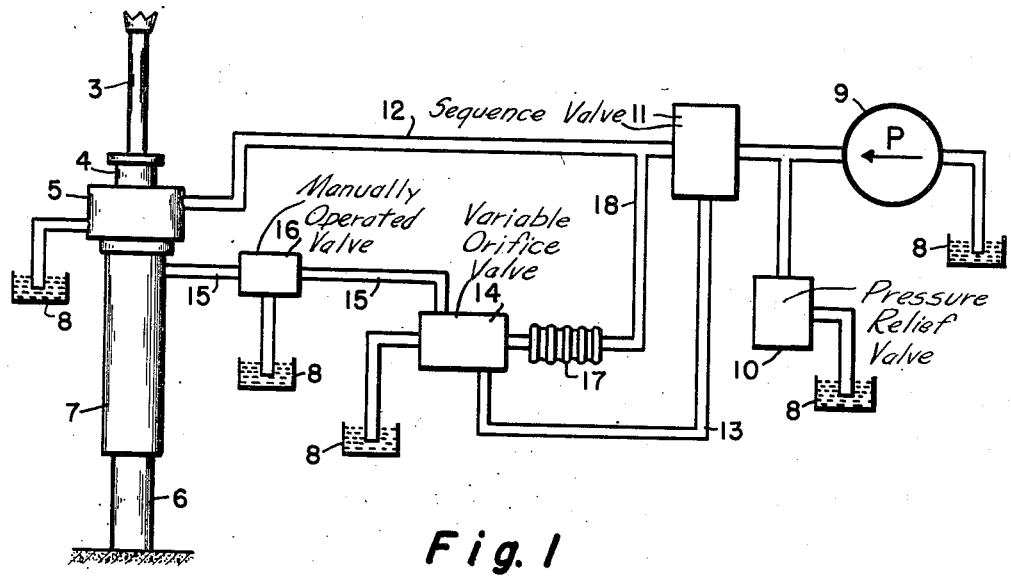

Sept. 3, 1957 J. S. SCHROEDER 2,804,751
PRESSURE ACTUATED CONTROL FOR HYDRAULIC POWER SYSTEMS
Filed June 5, 1953

INVENTOR.
John S. Schroeder
BY
HIS ATTORNEYS

United States Patent Office 2,804,751
Patented Sept. 3, 1957

2,804,751

PRESSURE ACTUATED CONTROL FOR HYDRAULIC POWER SYSTEMS

John S. Schroeder, Edgeworth, Pa., assignor, by mesne assignments, to Schroeder Brothers Corporation, Pittsburgh, Pa., a corporation of Pennsylvania Application June 5, 1953, Serial No. 359,916

4 Claims. (Cl. 60—97)

This application relates to a control for hydraulic power systems, particularly systems in which two separate elements, each driven by hydraulic pressure, are involved in one operation and in which the action of one element is affected by the action of the other. An example of a hydraulic power system to which my invention is applicable is a coal drill in which the bit is turned by a hydraulic motor and in which the bit is fed into the work by a piston operating in a hydraulic cylinder.

My invention is particularly useful for mining drills and, therefore, it will be described with reference thereto. It is to be understood, however, that my invention can be used in hydraulic power systems generally where two or more mechanisms, actuated by hydraulic power, are connected together in such a way that the action of one affects the action of the other.

Drills used in the mining industry and to which my invention is particularly applicable comprise a bit held in a chuck which is rotated by a hydraulic motor. The bit is fed into the work by a piston acting in a hydraulic cylinder which presses against the drill body and against a fixed support such as the floor of the mine. As drilling proceeds, fluid under pressure is admitted to the cylinder and the piston thus feeds the bit into the work.

Heretofore, considerable difficulty has been experienced in controlling the rate at which the bit is fed to the work due to varying conditions which are encountered in mining. For example, a drill may start through soft material, such as coal, and strike a layer of hard material, such as slate, following which there will be another layer of soft material, and so on. The different materials vary widely in their drilling characteristics. In every case, it is, of course, advantageous to operate the motor which turns the drill at a pressure near the maximum pressure permitted by the hydraulic system which drives the motor so that the drilling can be done as rapidly as possible, but that has not been possible prior to my invention.

Attempts have been made at controlling the feed rate by a manually operated valve but with said valve it has been necessary to operate the drill motor at a pressure far below the maximum permitted in the system. If a particularly hard material is encountered in drilling, the drill motor will stall unless the operator quickly decreases the rate of feed. To give the operator time to decrease the feed, the pressure in the system which drives the motor is kept well below the maximum. It takes a certain amount of time for the pressure in the line supplying the drill motor to build up to the maximum available in the system and during that time the operator can decrease its feed rate.

I have invented a control which permits the drill to be operated at pressures up near the maximum permitted in the system which drives the motor for the drill. My control also regulates the rate of feed of the drill in accordance with the pressures developed in the drill motor.

Figure 2:
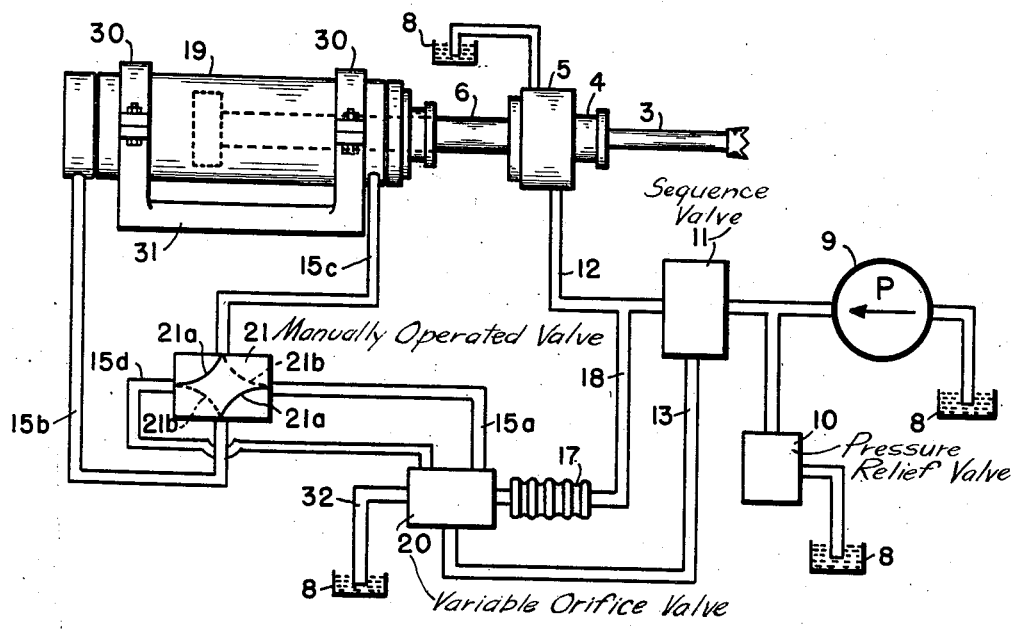

In the accompanying drawings, I have illustrated certain present preferred embodiments of my invention, in which:

Figure 1 is a schematic diagram of my system applied to a vertical drill, i. e., a drill for drilling holes in roofs of mines and in which a single acting cylinder is used to feed the drill into the material being cut; and Figure 2 is a schematic diagram of my system applied to a horizontal drill actuated by hydraulic pressure, in which there is a motor for turning a drill and a double acting cylinder controlling the feed of the drill.

Figure 1 shows my invention applied to a "stoper," i. e., a drill for drilling holes in the roofs of mines. The drill has a bit 3 held in a chuck 4 which is turned by a hydraulic motor 5. The drill also has a piston 6 and a cylinder 7 for feeding the bit into the roof of the mine as the hole is being drilled. The end of the piston 6, which is outside of the cylinder 7, rests on the floor and as drilling proceeds it is forced out of the cylinder 7 by fluid under pressure supplied to the cylinder.

The apparatus for driving the drill comprises a reservoir tank 8 for fluid which is used in the system, a hydraulic pump 9, a pressure relief valve 10, a sequence valve 11, a pipe line 12 whereby fluid is supplied from the pump through the sequence valve to the motor 5, and a pipe line 13 which supplies fluid from the pump through the sequence valve to a three way valve 14, hereinafter more fully described, and thence through piping 15 and a manually controlled three way valve 16 to the cylinder 7.

I also provide a bellows 17, which is connected by line 18 to line 12 and which is thereby actuated by pressure in the line 12. The bellows and the valve 14 are mechanically connected so that expansion and contraction of the bellows due to varying pressure in the line 12 actuates the valve.

The three way valve 14 is a conventional orifice valve, that is, as the valve is actuated, an orifice leading from the valve 14 into the line 15 is increased or decreased, thereby controlling the amount of fluid which flows into the piping 15 and thence to the cylinder 7.

The operation of my control system will now be explained. The operator turns the three way valve 16 to admit fluid into the cylinder 7. The sequence valve 11 first diverts fluid through line 13, the three way valve 14, line 15 and the manually controlled three way valve 16 into the cylinder 7. This presses the piston 6 out of the cylinder 7 and raises the bit 3 against the roof of the mine. A sufficient amount of pressure having thus been developed in the cylinder 7, the sequence valve diverts the balance of the fluid into the motor 5 to rotate the drill, the pressure in the line 12, of course, being determined by the resistance to drilling of the material being drilled. Fluid pressure in the supply line 12 to the motor 5 actuates the bellows 17 through the line 18, the position of the bellows 17 being determined by the pressure in the lines 12 and 18 and this, in turn, determining the position of the three way valve 14.

The pressure in the line 12 supplying the motor 5 is kept near the maximum permitted by the pressure relief valve 10. In the event that the drill bit encounters hard material and the resistance to the rotation of the bit increases the pressure in the lines 12 and 18 will increase and actuate the bellows 17 which thereby moves the three way valve 14 to decrease the orifice leading to the line 15 and thereby decrease the rate of fluid flow to the cylinder 7. This will decrease the rate of feed and correspondingly decrease the resistance of the material being drilled to the turning of the bit 3. Pressure in the motor 5 and the line 12 and 18 will decrease and the bellows 17 will move the valve 14 and increase the amount of fluid flowing into the line 15. In this way, the rate of feed will be regulated in accordance with the material encountered by the bit 3.

It will be noted that the three way valve 14 has a port leading back to the tank 8. This is provided to take care of forces other than the piston 6 and cylinder 7 which tend to feed the bit into the material being drilled. For example, if the drill is mounted on a pneumatic tired carriage, the pressure of the feed cylinder during regular drilling operations is such as to flatten the tires. If, however, the rate of flow of fluid to the cylinder 7 is cut down by the valve 14 and the bellows 17 by reason of drilling resistance encountered by the bit 3, the tires will then tend to rise because of the pressure within them and the pressure of these tires could be sufficient to press the drill against the material being cut and raise the pressure in the line 12 sufficiently to actuate the pressure relief valve 10 and thereby stall the motor. To prevent this action, one port of the valve 14 is connected to the tank 8 and the increased pressure developed by the tires expands the bellows 17 to move the valve 14 to a position connecting the line 15 with the tank 8, thereby permitting fluid to flow out of the cylinder 7 and thus compensate for the effect of the external force developed by the air pressure in the tires.

After the hole is completed, the operator turns the valve 16 to connect the line 15 to tank 8 whereupon the drill drops of its own weight.

Figure 2 of the drawings is a schematic diagram showing my control system applied to a horizontal drill or other hydraulic machinery in which the working tool is moved by hydraulic pressure both towards and away from the work being done. The apparatus shown in Figure 2 is essentially the same as that shown in Figure 1, but, whereas in Figure 1 the piston 6 is fixed and the cylinder 7 is movable, in Figure 2 the cylinder 19 is fixed and the piston 6 is movable. The cylinder 7 in Figure 1 is replaced by a double acting cylinder 19 and the three way valve 14, shown in Figure 1, which is actuated by the bellows 17, is changed to a four way valve 20, having two variable orifices. Also, the manual three way valve 16 is changed to a four way valve 21. Appropriate pipe lines have also been added as will be explained. The operation of the system shown in Figure 2 is generally the same as the system shown in Figure 1. However, the working tool driven by motor 5 is moved to and from the work by fluid under pressure, whereas in the system shown in Figure 1 the bit 3 is fed upwardly by hydraulic pressure and retracted by the force of gravity alone.

As shown in Figure 2, the cylinder 19 is supported in a fixed position by brackets 30 secured to a fixed support 31. The system shown in Figure 2 operates in the following manner. Assuming that the bit 3 has not been applied to the work, low pressure exists in lines 12 and 18 and bellows 17 and valve 20 is open to connect pipes 13 and 15a with valve 21. The operator now turns valve 21 to the solid line position 21a to supply fluid to the left-hand end of the cylinder 19 through pipe 15a, valve 21 and pipe 15b. This moves the piston 6 to the right together with the motor 5 and bit 3 secured thereto so that the bit contacts the work. Fluid flows from the right-hand end of the cylinder through pipe 15c, valve 21, pipe 15d, valve 20 and pipe 32 to the reservoir 8. If the bit 3 driven by the motor 5 encounters resistance, pressure is developed in the motor, pipes 12 and 18 and bellows 17. The bellows expands and actuates valve 20 to cut down the flow of fluid through pipes 15a, valve 21 and pipe 15b to the left-hand end of the cylinder 19. If the resistance to the drill increases sufficiently, the flow of fluid to the left-hand end of the cylinder is entirely cut off and, in fact, when the resistance to the bit 3 is high enough, the bellows 17 actuates the valve 20 to introduce fluid to the right-hand end of the cylinder 19 through pipe 13, valve 20, pipe 15d, valve 21 and pipe 15c, thereby moving the piston to the left and decreasing the pressure on the bit. As piston 6 moves to the left in cylinder 19, fluid flows through pipe 15b, valve 21, pipe 15a, valve 20, pipe 32, to the reservoir 8. When the pressure on the bit is decreased sufficiently, the decreased pressure in pipes 12 and 18 and bellows 17 operates valve 20 to again supply more fluid to the left-hand end of the cylinder, thereby again feeding the bit into the work. Thus, the movement of the bit toward and away from the work is regulated automatically according to the resistance to rotation encountered by the bit.

After the hole has been drilled and the operator desires to retract the bit from the work, he turns valve 21 to the dotted line position 21b, thereby connecting pipe 15a with pipe 15c and pipe 15b with pipe 15d, thus feeding fluid to the right-hand end of the cylinder 19 and moving the piston to the left retracting the bit from the work. Valve 21 also has a third position in which all ports are closed, thereby enabling the operator to stop the travel of the piston 6 at any desired position.

My invention can be used to control the action of hydraulically driven machinery other than mining drills. For example, instead of controlling the flow of fluid to a double acting cylinder such as cylinder 19 in Figure 2 which actually moves the tool to and away from the work, I can use my control to regulate the flow of fluid to a hydraulic pilot control which, in turn, actuates controls for other types of machinery. Thus my control can be utilized on a "Colmol," a machine which has rotary cutting heads for digging out coal, which heads are carried on a machine moving on Caterpillar tracks. A motor corresponding to the motor 5 in Figures 1 and 2 rotates these heads and another hydraulic motor drives the Caterpillar tracks forcing the machine into the coal as it is mined. If the rotary cutting heads stall, then my system will actuate the pilot control which controls the drive for the Caterpillar treads to slow down the forward motion of the treads or to reverse them in accordance with the pressure developed in the motor for the rotary cutting heads.

From the foregoing description, it is apparent that I have invented a control for hydraulic power systems used on machines having two or more hydraulically driven elements and in which the hydraulically driven elements are affected by the action of the other. My invention is particularly useful in mining drills in that it closely correlates the feeding of the drill with the resistance developed against rotating the drill and makes it possible to utilize substantially the full amount of pressure for which the hydraulic system is designed.

While I have described certain present preferred embodiments of my invention, it is to be understood that they may be otherwise embodied within the scope of the appended claims.

I claim:

1. In a machine having at least two hydraulically driven elements, at least one of which is a double acting cylinder, and a hydraulic power system therefor including a source of fluid under pressure, a control for said system comprising a valve having two variable orifice ports connected one to each other end of said cylinder, the inlet port of said valve being connected to said pressure source, pressure actuated means in the line leading from said pressure source to a second driven element, said pressure actuated means and said variable orifice valve being operatively connected whereby variation in the pressure in the line to the second driven element varies the pressure in the two ends of the double acting cylinder.

2. A control for a hydraulic power system as described in claim 1 and having a reservoir tank connected to said fluid source and a manual valve in the lines between said variable orifice valve and said cylinder, said manual valve also having a port connected to said reservoir tank.

3. A control for a hydraulic power system as described in claim 1 in which a reservoir is connected to said fluid source and in which said variable orifice valve has a port connected to said reservoir tank.

4. A control for a hydraulic power system as described in claim 1 and having a manually operated four way valve in the lines between said variable orifice valve and said cylinder, said manual valve having a port connected to each end of said cylinder.

References Cited in the file of this patent

UNITED STATES PATENTS

| | | |
|---|---|---|
| 1,677,860 | Ferris | July 17, 1928 |
| 2,406,482 | Tucker | Aug. 27, 1946 |
| 2,459,902 | Tucker | Jan. 25, 1949 |
| 2,585,328 | Johnson | Feb. 12, 1952 |